Sept. 17, 1957 J. P. GUTIERREZ 2,806,902

PRESET AUTOMATIC REDIAL

Filed Dec. 10, 1951 3 Sheets-Sheet 1

INVENTOR

JOSEPH P. GUTIERREZ

BY Hall & Houghton

ATTORNEYS

PRESET AUTOMATIC REDIAL

Filed Dec. 10, 1951 3 Sheets-Sheet 2

INVENTOR

JOSEPH P. GUTIERREZ

BY *Hall & Houghton*

ATTORNEYS

PRESET AUTOMATIC REDIAL

Filed Dec. 10, 1951

INVENTOR
JOSEPH P. GUTIERREZ

BY *Hall & Houghton*
ATTORNEYS 2,806,902

PRESET AUTOMATIC REDIAL

Joseph P. Gutierrez, Winter Haven, Fla., assignor to Automatic Redial Corporation, Washington, D. C., a corporation of Delaware Application December 10, 1951, Serial No. 260,924

12 Claims. (Cl. 179—5)

This invention relates to telephone accessories and aims generally to provide an accessory for relaying calls and signals without expensive central office installations or leased wire circuits.

Prior call relaying devices for transferring a call from one line to another have required extensive modifications of central office equipment that have militated against commercial adoption of the proposed arrangements in the extensive telephone networks of the United States. The present invention aims to provide a simple method and means for transferring a call from a subscriber station to another station that is adapted for installation as an accessory part of the subscriber's equipment and that may be set and operated without special circuits or services at the central office.

A particular object of the invention is to provide an accessory for use at any subscriber station served either directly or indirectly by two or more telephone trunks that will automatically receive an incoming call on one trunk, dial a preset number on a second trunk, and connect the incoming call to the outgoing trunk.

A second object is to provide an accessory that may be used as an automatic burglar or fire alarm employing the normal subscriber's telephone lines, without necessity for special leased wires to fire or protective offices.

Other objects of the invention severally and interdependently are to provide a self contained redial device, requiring but few and simple parts in its construction; to provide an improved method for accomplishing the dialing of preset numbers; to provide a redial device capable of operating with two trunk lines at the subscriber's station, and requiring no special central office equipment or change or central office equipment for its operation; to provide an improved circuit for a redial device for the handling of an incoming call; to provide a redial device that is adaptable for burglar and fire alarm operation with a minimum of modification; and to provide special features and combinations of elements contributing to the realization of the foregoing objects.

In the accompanying drawings of illustrated embodiments of the invention

Figure 1:
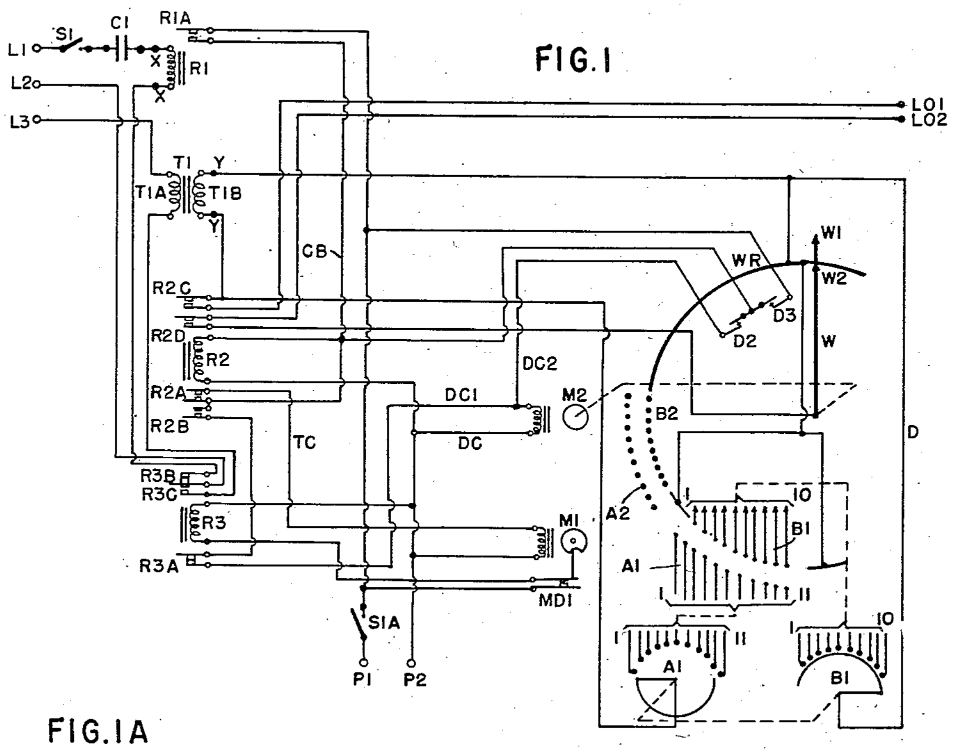
Fig. 1 shows a complete circuit diagram of a first embodiment, Figs. 1A, 1B and 1C being simplified diagrams of portions of Fig. 1.
Figure 1A:
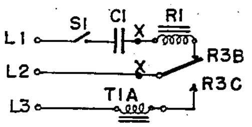
Figure 1C:
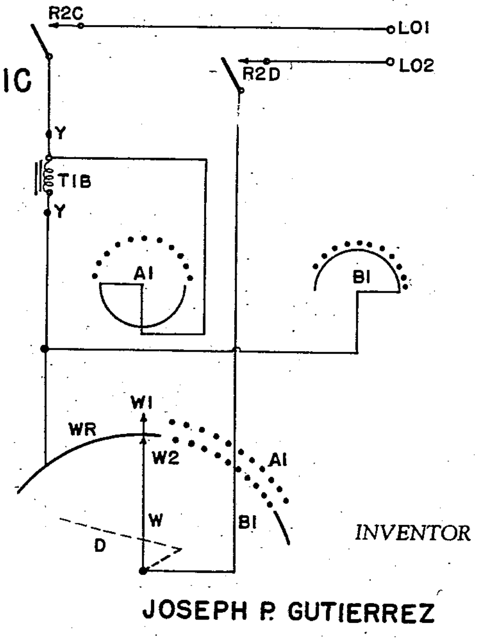

In the illustrative embodiment of Figs. 1 through 1C the lines L1, L2 and L3, Figs. 1 and 1A, are connected to the incoming trunk or line and lines LO1 and LO2 Figs. 1 and 1C are connected to the outgoing line or trunk, preferably at a subscriber's station served by two trunk lines either directly, or indirectly through another circuit in the same building. As will be understood by those skilled in the art the lines L1 and L3 may be connected together when the attachment is used on a two wire circuit. The terminals P1 and P2 are connected to any suitable local power source for operating the relays and motors comprised in the accessory. The power line P1 or P2 may be provided with a suitable switch such as the single pole, single throw switch S1A and the input line L1 may also be provided with a switch S1 and an isolating condenser C1.

Figure 1B:
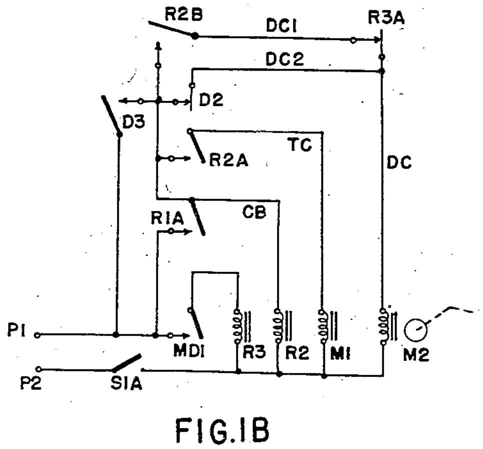

As is clearly shown in Figs. 1 and 1B, the accessory device comprises a control bus CB and a first or pilot relay R1 having contacts R1A connecting said power source P1, P2 to the control bus. The circuit further has a second relay R2 energized from the control bus CB, a timer circuit TC leading from the control bus and a driver circuit DC having first and second branches DC1 and DC2 each leading from the control bus. The second relay R2 controls contacts R2A and R2B, in the timer circuit TC, and in the branch DC1 of the driver circuit DC, respectively.

Included in the timer circuit TC is a suitable timer element shown as a motor driven timer M1, the cam of which keeps contacts MD1 open for a first timing interval and closes said contacts for a second timing interval.

Included in the driving circuit DC is a suitable driver for the dialing mechanism and associated switches, shown as a driving motor M2. This motor M2 drives the dialing switch D (Figs. 1 and 1C) through its cycle or operation.

The dialer D, as best shown in Fig. 1, comprises a pair of terminals at contacts R2C and R2D that are connected to the outgoing lines LO1 and LO2 when relay R2 is energized. The automatic dialing device D itself comprises a commutator including a contact ring WR and at least one set of numeral dialing contacts A1—B1 arranged sequentially in a gap in said ring, with a motor driven brush or wiper W, actuated by the driver M2 that is arranged to wipe across the ring and contacts during a cycle of operation. The ring WR in a particular installation is provided with as many gaps having numeral (numeral or letter) dialing contacts therein as are employed in the telephone exchange system used at the subscriber's station, as indicated for example by the additional gap and set of contacts A2, B2 in Fig. 1.

As is further shown in Fig. 1 the odd numbered separate contacts of each set exemplified at A1 are carried out to the switch points of an adjustable fan switch also designated A1 for connecting the said contacts sequently, counting from a first end of the set, to one terminal R2C of the dialer mechanism, the brush or wiper W2 being connected to the other terminal R2D thereof. The even numbered contacts B1 as shown in Fig. 1 are carried out to the switch points of a second fan switch B1 which is preferably ganged to the fan switch A1 for simultaneous operation therewith, and which serves for sequentially connecting the even numbered contacts of higher number than those connected by the switch A1 to the contact ring WR. A load T1B, which in Fig. 1 is the secondary of the repeater transformer T1 is connected between the contact ring WR and the terminal R2C.

With the arrangement just described the wiper ring WR fills in all space between each group of contacts A1, B1, A2, B2, etc., and if four contacts in A1, for example, are connected to one side of the outgoing line through switch A1 and terminal R2C, the three contacts of B1 between them are disconnected from repeater transformer secondary T1B.

Thus as the wiper arm W passes these contacts, it will cause pulses in the outgoing line LO1, LO2, due to shorting of the line through contacts A1, the repeater transformer coil T1B having been taken out of the circuit through the opening of the switch points of fan switch B1. The contacts A1, B1 and the ring WR are so spaced relative to each other that the brush or wiper W makes contact with each ensuing element before breaking the contact previously made with the preceding element.

In more detail, in the form shown in Figs. 1 and 1C, as wiper W moves its contacts W2 and W1 along ring WR line LO1 is connected to outgoing line LO2 via WR (and any points of group B1 connected thereto by fan switch B) through repeater transformer coil T1B.

When wiper W reaches the first A1 contact that is connected to outgoing line LO1 by fan switch A1, the repeater coil T1B is shorted out of the LO1—LO2 loop circuit and contact W2 then leaves the last bridged B1 contact, opening the T1B to LO2 circuit.

As contact W1 leaves the first bridged A1 contact, W2 engages only the open circuited adjacent B1 contact, so the LO1—LO2 circuit is momentarily opened until W1 remakes it by contacting the next bridged A1 contact.

When W1 is about to leave the last bridged A1 contact, W2 first recloses the LO2, W, W2, WR, T1B, LO1 circuit, and W1 then breaks the A1 connection that had shorted out coil T1B during the transmission of the digit pulses.

Thus the transmission of digit pulses is effected by opening and closing the line circuit excluding the repeater coil T1B, and after each group of digit pulses is transmitted the repeater coil T1B is again included in the outgoing line circuit.

Suitably actuated in timed relation to the operation of the wiper W are pilot shunting and driver suspending switches D3 and D2 respectively. The pilot shunting switch D3, initially open, is closed as soon as operation of the driver M2 is initiated, herein by placing it in position to be released by the initial movement of the wiper W. This switch D3 as best shown in Fig. 1B shunts the pilot relay contacts R1A of the pilot relay R1 during the cycle of the dialing switch D.

The driver suspending contacts D2, are connected in the second branch DC2 of the driver circuit DC, and are arranged to be opened to stop the dialer after it has completed its dialing operation, herein by placing them adjacent the path of movement of the wiper W to be opened thereby after all the sets of contacts A1—B1, A2—B2, etc. have been scanned.

In addition to the timing motor M1 and timer contacts MD1, the timing mechanism comprises a third relay R3 having an energizing circuit which, in Fig. 1, is fed from the local power source P1, P2, the circuit being completed through the timer contacts MD1. The timing relay R3 in this embodiment opens a first set of contacts R3A that are connected in the first branch DC1 of the driver circuit DC, for breaking said first branch circuit on energization of said third relay R3 and for remaking the same on deenergization thereof. In this embodiment the third relay R3 also controls single pole double throw contacts R3B, R3C for stopping the ringing signal by transferring the incoming call from the pilot relay R1 and placing it across the input terminals T1A of the repeater transformer T1, when the relay is energized.

The operation of the embodiment of Figs. 1 through 1C is as follows:

The incoming signal actuates pilot relay R1. This closes pilot contacts R1A, thus closing the circuit from power source P1, P2 to the control bus CB. Energizing of this bus energizes the circuit of driver motor M2 through its branch DC2 since the switch D2 therein is closed at the commencement of the operation. Energizing of control bus CB also energizes the relay R2 which completes the circuit of the timer motor M1 through its contacts R2A, and which also completes the alternate circuit of the driver motor M2 through its contacts R2B since the driver suspending contacts R3A are closed at the beginning of the operation.

Energizing of relay R2 also closes contacts R2C and R2D connecting the dialing circuit and the repeater transformer winding T1B to the outgoing lines LO1, LO2.

When driver motor M2 starts, initiating operation of the brush or wiper W, contact D3 closes, shunting out the pilot contacts R1A. This action insures supply, to motors M1 and M2 and relay R2, of a constant supply of power unaffected by pulses of the calling signal in the pilot relay R1.

The dialing of the new number on the outgoing lines LO1, LO2 is accomplished in the manner above described as the brush or wiper W2 passes over the respective contacts of the sets A1, B1, A2, B2, etc.

At the completion of the automatic dialing of the preset number on the outgoing lines, the wiper arm W, or the driver M2 driving the same, opens contact D2 in the branch DC2 of the driver circuit DC.

Also, in timed relation to, and preferably on completion of, the dialing operation the timer M1 closes timing contacts MD1 to connect to its source of power the third relay R3, for opening contact R3A in the first branch DC1 of the driver circuit DC. As both branches of this circuit are thus open simultaneously, the operation of the driver motor M2 and wiper W is suspended.

The embodiment of Fig. 1 also includes means for automatically connecting the call delivering means (lines L2, L3 in this embodiment) to the call transmitting means (repeater transformer T1). For this purpose the timing mechanism comprises not only the timing element M1, MD1, but also the contacts R3B, R3C of the relay R3 energized under control of the timing mechanism, which stop the ringing signal by disconnecting the relay R1 and putting the incoming call across the coil T1A of the repeater transformer T1

As by the operation so far described both the incoming and outgoing lines have been connected through the repeater transformer T1, the calling party will now hear only the ring back signal of the second station to which the call has been transferred, while prior to the connection, he heard only the ring back signal of the subscriber's station where the device was installed. Thus at no time is the calling party confused by the changing of the call from the incoming to the outgoing circuit. If the station being called by the device is busy, the calling party will hear the busy signal and will again attempt to complete the call at a later time. If the redialed station answers the call, the conversation will be carried through the repeater transformer T1.

At the end of the timing cycle, which can be set to the desires of the subscriber or phone company, the motor M1 of Fig. 1 through its timing cam opens contact MD1 which releases the relay R3. This release opens contact R3C and closes contact R3B, returning the incoming signal circuit to its original position, ready to receive a new call. Releasing the relay R3 also closes contact R3A in branch DC1 of the driver circuit, restarting the driver M2 to return the brush or wiper W to its original position at which it opens contact D3, thus opening the circuits of timer motor M1 and driver motor M2 to stop them at their original positions, and releasing relay R2 to restore all its contacts to their original positions ready to again operate on receipt of an incoming signal.

Figures 2, 2A:
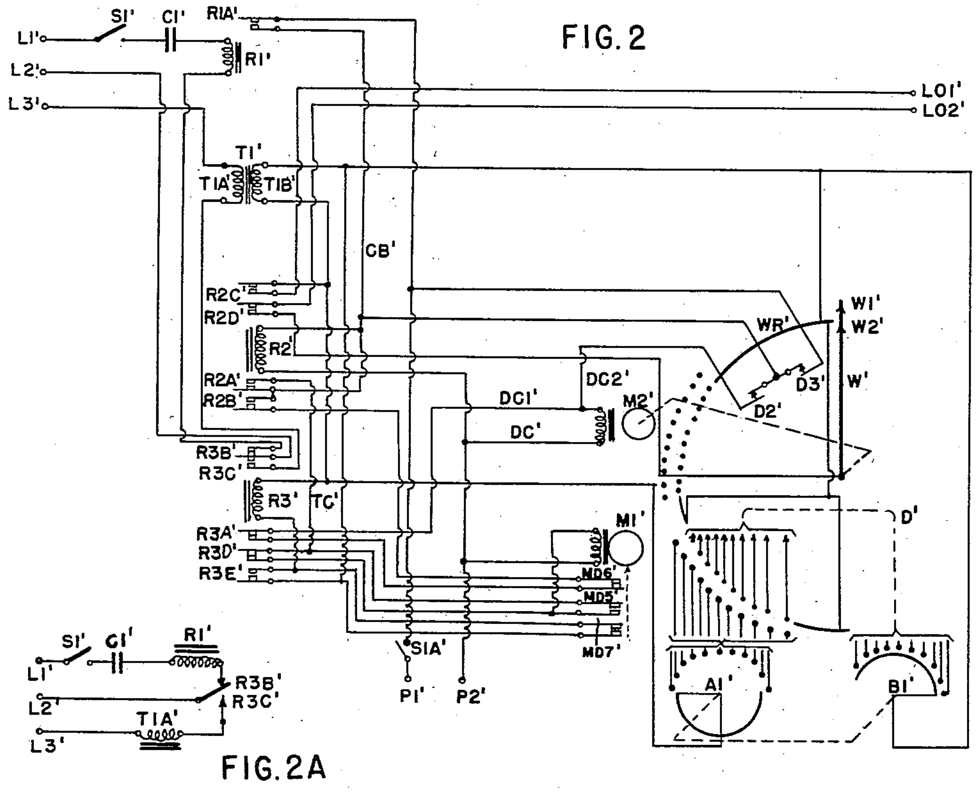
Fig. 2 is a circuit diagram of a second embodiment that may be used on a system in which the line polarity is reversed, Figs. 2A, 2B and 2C being simplified diagrams of portions of Fig. 2.
Figure 2C:
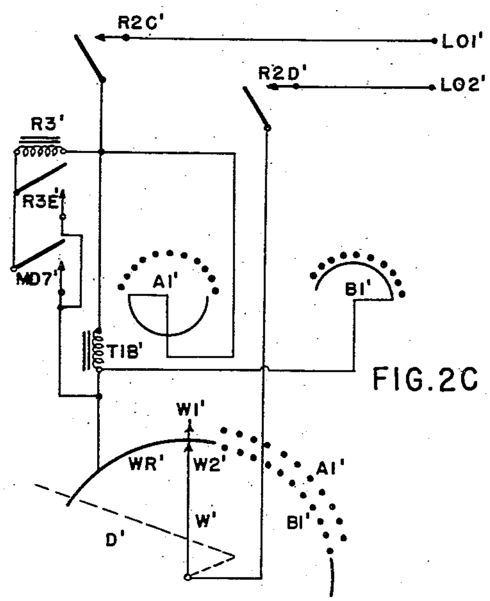
Figure 2B:
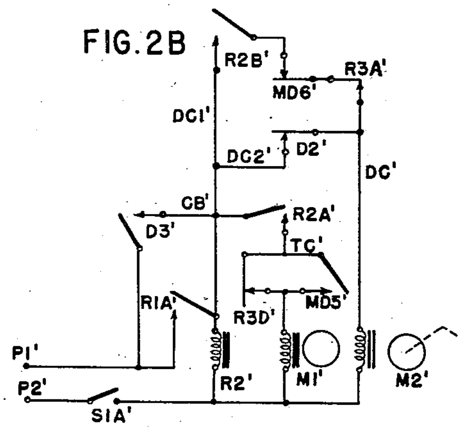

In Figs. 2 through 2C a modification of the circuits is shown especially adapted for use on a system in which the line polarity is reversed incident to the completion and termination of the call. Although the first embodiment shown in Fig. 1 can be used on such a system, the modification of Fig. 2 has the advantage that the call is not limited by the timing element M1, but is controlled by the calling or the called party through the use of a polarized relay R3' that responds to the reversal of polarity in the system, and that suspends the restoring operation until such polarity is again reversed.

The incoming call is handled in this arrangement in the same way as in the first embodiment, and for clarity and ease of reference the elements of the second embodiment corresponding generally to those of the first embodiment are designated by like reference numerals distinguished with a "prime" mark.

In the second embodiment the dialing is also handled in the same way as in the embodiment of Fig. 1. However in the timing mechanism the third relay is changed to a polarized relay R3′ and is connected to the outgoing lines LO1′, LO2′ as an energizing source through contact MD7′ of the timing motor M1′, and alternatively through the holding contact R3E′ when relay R3′ of the timing mechanism is closed.

In this embodiment the timer circuit TC′ in series with the relay contacts R2A′ is provided with two branches or parallel paths, respectively including contacts R3D′ opened on operation of the polarized relay R3′, and holding contacts MD5′ operated by the timer element M1′. By this arrangement timing motor M1′, which is initially energized through contacts R2A′ and R3D′, closes its holding contacts MD5′ as it connects the relay R3′ to the line for actuation by polarity reversal therein, and timing element M1′ is thus kept running through contact MD5′ until it has completed one cycle of its operation.

In this second embodiment, also, the dialing motor branch circuit DC1′ further includes a contact MD6′ which is opened by the timer motor M1′ as it closes the contacts MD7′ and MD5′, and which is again closed by timer motor M1′ when it completes its cycle.

With these modifications if the call is not answered within the time predetermined by the timer M1′ the timer recloses the branch circuit DC1′ and restores the dialer D′ to its initial condition as in the embodiment of Fig. 1, but without the incoming circuit having ever been connected to the repeater transformer T1′. If the call is answered the reverse polarity relay R3′ energizes and performs the following operations: through contacts R3B′ and R3C′ it connectes the incoming call to the repeater transformer coil T1A′; by opening contact R3A′ it prevents the dialing motor M2′ from returning to its original position and resetting the device; by opening contact R3D′, it prevents the timer motor M1′ from commencing another cycle after it reopens contact MD5′; and by closing holding contact R3E′ it shunts out the timer controlled contact MD7′ so that if the call is still in progress at the end of the cycle of the timing element M1′, opening of contact MD7′ will not terminate it, i. e. so that the relay R3′ will continue to be energized from the line until the call is completed and the line polarity is reversed, at which time the relay R3′ opens due to the polarity reversal.

The effect of the opening of relay R3′ due to the polarity reversal is the same as the effect of opening the energizing circuit of relay R3 in Fig. 1, viz: by contacts R3B′ and R3C′ it restores the initial connections of the incoming line; by releasing R3E″ it breaks its own holding circuit; by releasing R3D′ it restarts timer M1′; by releasong R3A′ it restarts the suspended operation of the cycle of driver M2′ and wiper W′. By these operations the device is restored to its original condition, in the same manner as in Fig. 1.

Relay R3′ may be energized or controlled either from the outgoing line or the incoming line depending upon which one has its polarity reversed in the local system, and in the arrangement shown this relay is connected to and powered from the outgoing line, and connects the incoming line or call delivering means L2, L3 to the call transmitting means shown as the repeater transformer T1′ when the outgoing line answers.

Figure 3:
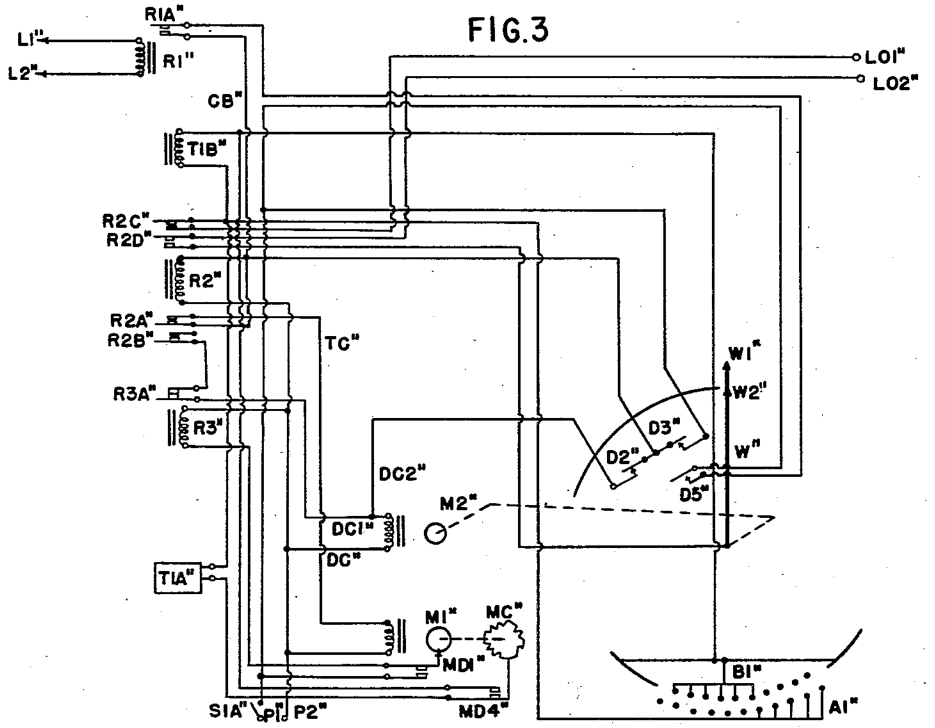
Fig. 3 is a diagram showing the adaptation of the device for use as a fire or burglar alarm calling device, Figs. 3A, 3B and 3C being simplified diagrams of portions of Fig. 3.
Figures 3A, 3B, 3C:
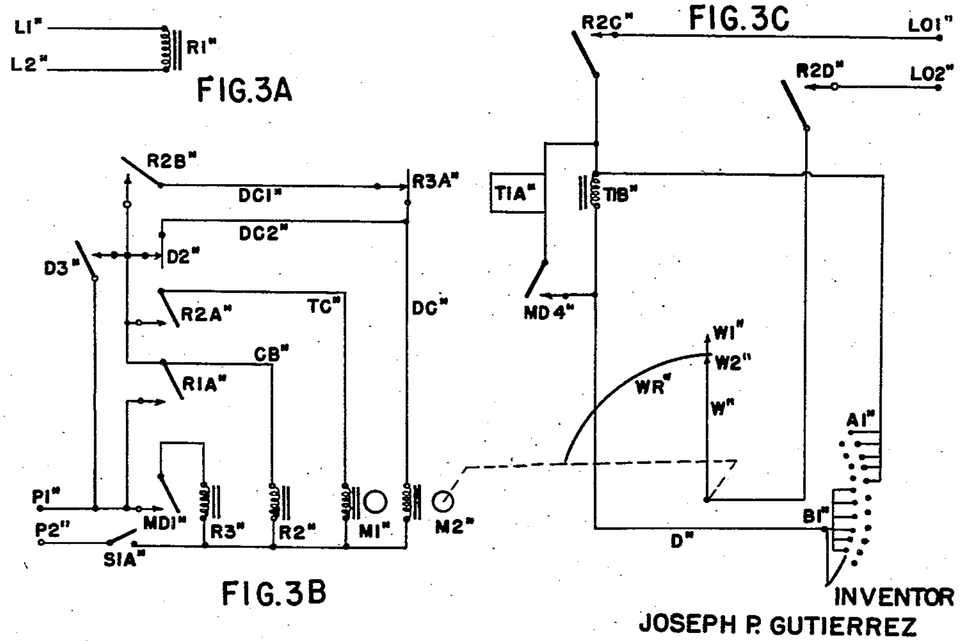

In Figs. 3 through 3C is shown an adaptation of the device to be used as a fire or burglar alarm caller. In this connection elements corresponding to those in Fig. 1 are again identified by similar reference numerals distinguished by "double prime" marks, and in certain instances simplified elements are indicated that may be used if the device is to serve as an alarm transmitter exclusively.

In this embodiment pilot relay R1″ may be any form of relay which can be energized by any present system for detecting a fire or by any present burglar alarm system. The dialing system D″ is the same as before, but may be preset by permanent wiring of the contact connecting means of each digit contact zone A1″—B1″ etc. as indicated in Fig. 3, in lieu of being provided with the variable or adjustable fan switch contact connecting means employed in Figs. 1 and 2.

Contact R1A″ of relay R1″ starts the device by shunting out contact D3″ energizing dialing motor M2″ and relay R2″. Relay R2″ through contacts R2C″ and R2D″ connects the outgoing line to an impedance or holding coil T1B″ and to the dialing mechanism D″.

Contact R2A″ starts timer motor M1″. On completion of the dialing operation by motor M2″ and wiper W″ contact MD1″ of timing motor M1″ closes and energizes relay R3″ which opens contact R3A″ in branch DC1″ of the driver circuit for the driver M2″. The dialing motor M2″ therefore stops when it opens the switch D2″ in the second branch of its driving circuit DC2″. The timing motor M1″ is so arranged that as the dialing cycle is completed a coding means such as the coding wheel MC″, is readied to pulse coding contact MD4″. This contact MD4″ can be used to pulse the outgoing line LO1″, LO2″ either by shorting it or through any tone producing device T1A″. These pulses give the answering party the location of the alarm call.

At the completion of the timing cycle of timer M1″ contact MD7″ opens deenergizing relay R3″, thereby closing contact R3A″ and energizing motor M2″ which returns to the starting position at which it opens contact D3″ and deenergizes the control bus CB″.

If desired, as indicated in Fig. 3, the alarm device may be provided with a cut-out switch to prevent repeated operation thereof. Such switch, as illustrated, may comprise a trip contact D5″ which is initially closed and is tripped open at the start of the dialing cycle and remains open to prevent repeating of the call as when relay R1″ is used with alarm giving systems that operate continuously.

It will be observed that the special elements of Fig. 3, or equivalents thereof, may be combined in the circuits of Fig. 1 or 2. As indicated in Fig. 1, for example, connection points XX, associated with signal responsive relay R1 may be provided to which the alarm signalling elements L1″ and L2″ of Fig. 3 may be connected, and connection points YY associated with the call transmitting element T1B may be provided, to which leads from a code transmitter as MC″, MD4″ (Fig. 3) may be connected.

Or, as will also be apparent from Figs. 1 and 2, the input L1, L2, L3, may be derived from the alarm device, which may incorporate the code transmitting device MC″, MD4″ of Fig. 3. The switch D5 of Fig. 3 may of course be installed in the dialing mechanism of Fig. 1 or Fig. 2, if desired, and be connected to interrupt either the alarm input circuit to relay R1, or the circuit of the contacts R1A in the manner exemplified in Fig. 3. In addition it will be appreciated that various elements of the combination that operate in timed relation to each other may be brought into action at the appropriate times by electrical means actuated by the previously acting element.

Thus, various modifications and recombinations of the elements of the circuit may be made within the broader aspects of the invention, wherefor it is to be understood that the exemplary embodiments above set forth are to be taken as illustrative, and not restrictive of the invention, the scope of which is defined in the appended claims, and that such modifications as come within the meaning or range of equivalency of the claims are intended to be secured thereby.

I claim:

1. An automatic dialing device for use with an outgoing telephone line comprising, at a subscriber's station, call transmitting means, means operable for automatically dialing a preset number, signal responsive means for connecting said dialing means to said outgoing line and initiating automatic operation of said dialing means, means for automatically connecting said call transmitting means to said outgoing line, a timing means also put into operation by said signal responsive means, call delivering means, said timing means connecting said call delivering means to said call transmitting means after an interval providing for the operation of said automatic dialing means.

2. An automatic dialing device for use with an outgoing telephone line of the type comprising, at a subscriber's station, call transmitting means, means operable for automatically dialing a preset number, signal responsive means for connecting said dialing means to said outgoing line and initiating automatic operation of said dialing means, means for automatically connecting said call transmitting means to said outgoing line, a timing means also put into operation by said signal responsive means, call delivering means, said timing means connecting said call delivering means to said call transmitting means in which said dialing means is provided with separate switch means operable in connection with the dialing cycle for shunting said signal responsive means for holding the connections established by it, and is provided with additional switch means operable at the conclusion of the dialing operation for suspending operation of the dialing means, and in which said timing means shunts said switch means for restarting said dialing means at the conclusion of the interval established by the timing mechanism, to restore said additional switch means and separate switch means to their initial settings.

3. An automatic dialing device according to claim 2, in which said dialing means comprises a cut-out switch actuated incident to the dialing operation to prevent repeated operation of the device.

4. A device for attachment to telephone lines at a subscriber's station served by two trunks, comprising means responsive to the receipt of a call on one trunk for dialing a preset number on the second trunk, means for connecting the first trunk to the second trunk, and means for restoring the device to call-responsive condition after a given interval.

5. A device according to claim 4, further comprising means responsive to the receipt of a call for operating said restoring means a predetermined time after receipt of the call.

6. A device according to claim 4 further comprising means responsive to the receipt of a call and to completion of said call through said second trunk for operating said restoring means a predetermined time after receipt of the call in the event the call is not completed through the second trunk.

7. A device according to claim 6, in which the restoring means comprises a timer the cycle of which is initiated in response to the receipt of the call on the first trunk.

8. A device according to claim 6, in which the restoring means comprises means responsive to completion of the call through the second trunk that suspends operation of the restoring means for the duration of the call.

9. A device according to claim 8, in which the restoring means comprises restoring circuits including a timer the cycle of which is initiated in response to the receipt of the call on the first trunk and a polarized relay operable in response to reversal of polarity in one of said trunks incident to completion of the call through the second trunk, and in which the polarized relay breaks the restoring circuits on completion of the call and remakes said circuits and re-initiates operation of said timer on conclusion of said call.

10. A device according to claim 4, further comprising means for initiating automatic dialing of a protective agency on the second trunk in response to an alarm at the subscriber's station and means for transmitting a coded message to the protective agency after it responds on said second trunk.

11. An automatic dialing device for attachment to telephone lines at a subscriber's station having an incoming call delivering trunk and an outgoing telephone trunk, comprising a control bus (CB) a power source (P1P2) a first relay (R1) having contacts (R1A) connecting said power source to said control bus, a second relay (R2) connected to be energized from said control bus, a timer circuit (TC) leading from said control bus, and a driver circuit (DC) having first and second branches leading from said control bus, said second relay (R2) controlling contacts (R2A and R2B) in said timer circuit and said first branch circuit; a timer (M1) in said timer circuit, a driver (M2) in said driver circuit, a multicontact dialing switch (D) having a cycle of operation through which it is driven by said driver (M2), a switch (D3) connected to be actuated by said driver for shunting the contacts (R1A) of said first relay during the cycle of said dialing switch (D), driver suspending contacts (D2) in the second branch circuit opened by said driver after the dialing operation, and a timing relay (R3) having an energizing circuit completed by said timer and controlling a contact (R3A) in series in said first branch circuit for breaking said first branch circuit on energization of said third relay (R3) and for remaking the same on deenergization thereof.

12. An automatic dialing device according to claim 11, in which said third relay (R3) having its energizing circuit completed by said timer, is a polarized relay (R3') with its energizing circuit powered from a source of current that reverses in polarity incident to establishment and termination of the connection dialed through said outgoing trunk.

References Cited in the file of this patent

UNITED STATES PATENTS

| | | |
|---|---|---|
| 2,060,371 | Hilgers | Nov. 10, 1936 |
| 2,086,110 | Allen | July 6, 1937 |
| 2,088,065 | Holden et al. | July 27, 1937 |
| 2,124,913 | Engel | July 26, 1938 |
| 2,274,715 | Lomax | Mar. 3, 1942 |
| 2,534,850 | Bowne | Dec. 19, 1950 |
| 2,542,535 | Koelin | Feb. 20, 1951 |